United States Patent
Lwin et al.

(10) Patent No.: US 12,129,833 B2
(45) Date of Patent: Oct. 29, 2024

(54) SYSTEM AND METHOD FOR CONTROLLING AN ELECTRICAL POWER SYSTEM USING A DYNAMIC REGULATOR MAXIMUM LIMIT

(71) Applicant: General Electric Company, Schenectady, NY (US)

(72) Inventors: Min Naing Lwin, Austin, TX (US); Dustin Howard, Brookhaven, GA (US); Ignacio Vieto Miranda, New Haven, CT (US); Talha Irfanul Haque, Roanoke, VA (US)

(73) Assignee: GE Infrastructure Technology LLC, Greenville, SC (US)

( * ) Notice: Subject to any disclaimer, the term of this patent is extended or adjusted under 35 U.S.C. 154(b) by 199 days.

(21) Appl. No.: 17/398,501

(22) Filed: Aug. 10, 2021

(65) Prior Publication Data

US 2023/0049606 A1 Feb. 16, 2023

(51) Int. Cl.
*F03D 9/00* (2016.01)
*F03D 9/25* (2016.01)
*H02P 9/00* (2006.01)

(52) U.S. Cl.
CPC .............. *F03D 9/255* (2017.02); *H02P 9/007* (2013.01); *F05B 2270/337* (2013.01); *H02J 2300/28* (2020.01)

(58) Field of Classification Search
CPC ..... H02K 7/1838; H02K 19/365; H02J 3/381; H02J 2300/28; H02J 3/24; F03D 9/255; F03D 7/0272; F03D 7/0276; H02P 9/007; F05B 2270/337; F05B 2270/101; Y02E 10/72; Y02E 10/76
See application file for complete search history.

(56) References Cited

U.S. PATENT DOCUMENTS

| 8,310,074 | B2 | 11/2012 | Larsen et al. |
| 9,450,415 | B2 * | 9/2016 | Larsen .................... H02P 9/007 |
| 2013/0154263 | A1 | 6/2013 | Attia |
| 2017/0272014 | A1 * | 9/2017 | Ren ......................... H02P 9/007 |

(Continued)

FOREIGN PATENT DOCUMENTS

| CA | 2722848 A1 * | 4/2010 | ........... F03D 7/0224 |
| EP | 3214719 A1 | 9/2017 | |

(Continued)

OTHER PUBLICATIONS

The EP Search Report for EP application No. 22187266.6, Feb. 3, 2023, 7 pages.

*Primary Examiner* — Julio C. Gonzalez
(74) *Attorney, Agent, or Firm* — Dority & Manning, P.A.

(57) ABSTRACT

A method for controlling an electrical power system connected to an electrical grid having a generator and a power converter includes monitoring a speed condition of the electrical power system. The method also includes dynamically determining at least one regulator maximum limit for at least one regulator of the power converter based on the monitored speed condition. Further, the method includes operating the at least one regulator based on the at least one dynamic regulator maximum limit to avoid overmodulation of the electrical power system during high-slip operation and to improve sub-synchronous control interaction (SSCI) performance of the electrical power system.

16 Claims, 7 Drawing Sheets

(56) References Cited

U.S. PATENT DOCUMENTS

2017/0272015 A1    9/2017  Klodowski
2020/0195012 A1*  6/2020  Wagoner ................. H02P 9/007

FOREIGN PATENT DOCUMENTS

| EP | 3518368 A1 | | 7/2019 | |
|----|-----------|---|--------|---|
| EP | 3672062 A1 | | 6/2020 | |
| JP | H1198896 A | * | 4/1999 | ............... H02P 9/00 |

* cited by examiner

SYSTEM AND METHOD FOR CONTROLLING AN ELECTRICAL POWER SYSTEM USING A DYNAMIC REGULATOR MAXIMUM LIMIT

FIELD

The present disclosure relates generally to electrical power systems and, more particularly, to a system and method for limiting the modulation index used by less-critical control functions in an electrical power system during periods of high slip operation to preserve the modulation index margin for the most critical control functions.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity. For certain wind turbines, the gearbox steps up the inherently low rotational speed of the rotor for the generator to efficiently convert the rotational mechanical energy to electrical energy, which is fed into a utility grid via at least one electrical connection. Gearless direct drive wind turbines also exist.

Some wind turbine configurations include doubly-fed asynchronous generators (DFAGs). Such configurations may also include power converters that are used to convert a frequency of generated electric power to a frequency substantially similar to a utility grid frequency. Moreover, such converters, in conjunction with the DFAG, also transmit electric power between the utility grid and the generator as well as transmit generator excitation power to a wound generator rotor from one of the connections to the electric utility grid. Alternatively, some wind turbine configurations include, without limitation, alternative types of induction generators, permanent magnet (PM) synchronous generators, electrically-excited synchronous generators, and switched reluctance generators. These alternative configurations may also include power converters that are used to convert the frequencies as described above and transmit electrical power between the utility grid and the generator. A typical wind turbine power converter includes a rotor-side converter connected to a line-side converter via a direct current (DC) link.

At least some known electric utility grids include one or more series-compensated transmission lines. Sub-synchronous control interactions (SSCI) is a phenomenon that occurs when power-electronic converter controls interact with such series-compensated transmission lines. These interactions can sometimes lead to control instabilities if control systems are not tuned properly or if the control margin of the power converter in properly-tuned control systems is not maintained.

Power generation equipment, such as wind turbines, are also required to deliver power throughout the generator operating range, including overload events while maintaining stability. At extreme slips, the stability can be compromised due to overmodulation as a consequence of DC link voltage constraints. While operating at these high slips, maintaining control of torque and speed in a stable manner is important to avoid tripping and/or overmodulation. When not operating at extreme slips, other control functions (in addition to torque/speed control) are important for stability and grid-code compliance (e.g. control of harmonics, DC current, SSCI stability). Each of these control functions requires a certain level of modulation index margin to perform their control function.

Accordingly, the present disclosure is directed to systems and methods for limiting the modulation index used by less-critical control functions during periods of high slip operation to preserve the modulation index margin for the most critical control functions (e.g. speed/torque control) so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling an electrical power system connected to an electrical grid. The electrical power system has a generator and a power converter. The method includes monitoring a speed condition of the electrical power system. The method also includes dynamically determining at least one regulator maximum limit for at least one regulator of the power converter based on the monitored speed condition. Further, the method includes operating the at least one regulator based on the at least one dynamic regulator maximum limit to avoid overmodulation of the electrical power system during high-slip operation and to improve sub-synchronous control interaction (SSCI) performance of the electrical power system.

In an embodiment, the regulator(s) of the power converter may be, for example, a current regulator or a voltage/VAR regulator of the power converter. Further, in an embodiment, the electrical power system may be, for example, a wind turbine power system. In such embodiments, the speed condition of the electrical power system may include a rotor speed of a rotor of the wind turbine power system. Further, in an embodiment, the method may include filtering the rotor speed of the wind turbine power system.

In another embodiment, dynamically determining at least one regulator maximum limit for at least one regulator of the power converter based on the monitored speed condition may include, as the rotor speed approaches a synchronous speed of the generator of the wind turbine power system, increasing the at least one regulator maximum limit to improve the SSCI performance of the wind turbine power system.

In further embodiments, dynamically determining at least one regulator maximum limit for at least one regulator of the power converter based on the monitored speed condition may include, as the rotor speed moves away from the synchronous speed of the generator of the wind turbine power system, decreasing the at least one regulator maximum limit of the at least one regulator.

In another aspect, the present disclosure is directed to an electrical power system connected to an electrical grid. The electrical power system includes a doubly-fed asynchronous generator (DFAG), a power converter coupled to the DFAG, and a controller. The power converter is configured to convert a frequency of generated electric power from the DFAG to a frequency substantially similar to a frequency of the electrical grid. The controller is configured to perform a plurality of operations, including but not limited to monitoring a speed condition of the electrical power system, dynamically determining at least one regulator maximum limit for at least one regulator of the power converter based on the monitored speed condition, and operating the at least one regulator based on the at least one dynamic regulator maximum limit to avoid overmodulation of the electrical power system during high-slip operation and to improve sub-synchronous control interaction (SSCI) performance of the electrical power system. It should be understood that the electrical power system may further include any of the additional features as described herein.

In yet another aspect, the present disclosure is directed to a method for controlling an electrical power system connected to an electrical grid during high-slip operation. The electrical power system includes a generator and a power converter. The method includes, during the high-slip operation, limiting a modulation index used by one or more less-critical control functions of the electrical power system to preserve a modulation index margin for one or more more-critical control functions of the electrical power system. Further, the method includes, during the high-slip operation, operating the more-critical control functions using the preserved modulation index margin in a stable manner to avoid overmodulation of the electrical power system.

In an embodiment, the less-critical control function(s) of the electrical power system may include, for example, limiting harmonics, DC current, and/or sub-synchronous control interaction (SSCI) stability. In another embodiment, the more-critical control function(s) of the electrical power system may include, for example, speed and/or torque.

In further embodiments, limiting the modulation index used by the one or more less-critical control functions of the electrical power system to preserve the modulation index margin for the one or more more-critical control functions of the electrical power system may include decreasing the at least one regulator maximum limit of the at least one regulator as the rotor speed moves away from a synchronous speed of the generator of the electrical power system.

In additional embodiments, operating the more-critical control functions using the preserved modulation index margin in the stable manner to avoid overmodulation of the electrical power system may include increasing the at least one regulator maximum limit of the at least one regulator to as the speed condition approaches a synchronous speed of the generator of the wind turbine power system. It should be understood that the electrical power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
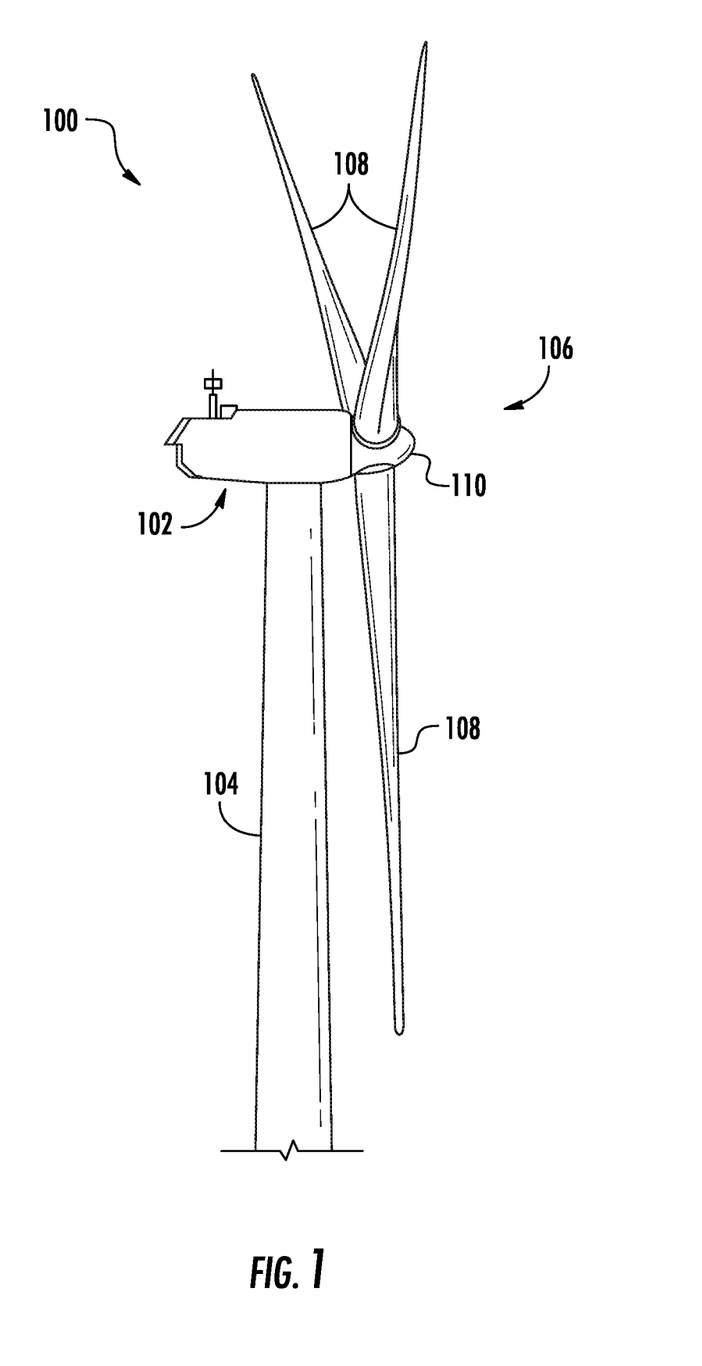
FIG. 1 illustrates a perspective view of one embodiment of a portion of a wind turbine according to the present disclosure.

Referring now to FIG. 1, a perspective view of a portion of a wind turbine 100 is illustrated. As shown, the wind turbine 100 includes a nacelle 102 housing a generator (not shown in FIG. 1). Further, as shown, the nacelle 102 is mounted on a tower 104 (a portion of the tower 104 being shown in FIG. 1). The tower 104 may have any suitable height that facilitates operation of wind turbine 100 as described herein. The wind turbine 100 also includes a rotor 106 that includes three rotor blades 108 attached to a rotating hub 110. Alternatively, the wind turbine 100 may include any number of rotor blades 108 that facilitate operation of the wind turbine 100 as described herein. In one embodiment, the wind turbine 100 may also include a gearbox (not shown in FIG. 1) operatively coupled to the rotor 106 and a generator (not shown in FIG. 1).

Figure 2:
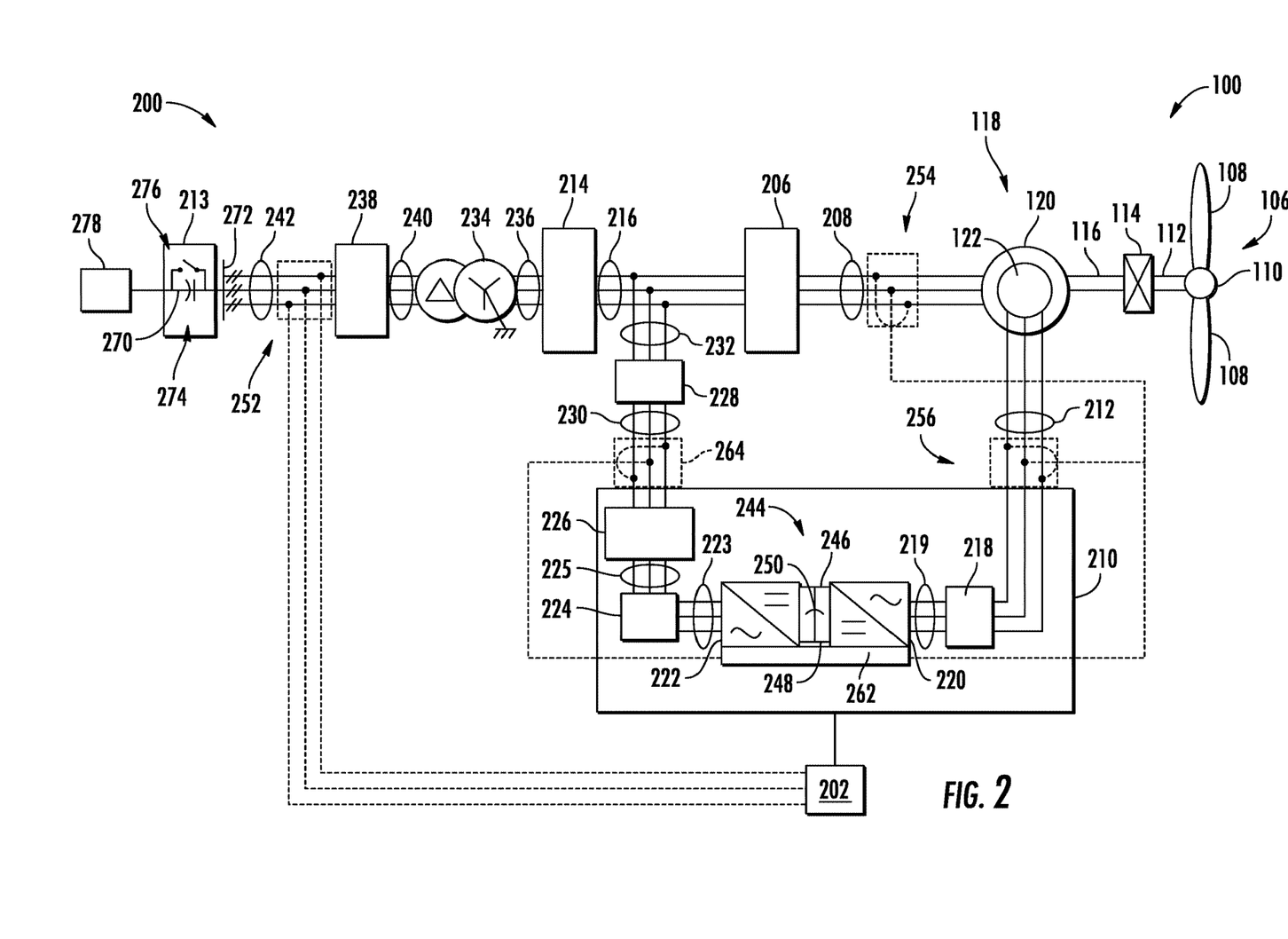
FIG. 2 illustrates a schematic view of one embodiment of an electrical and control system according to the present disclosure that may be used with the wind turbine shown in FIG. 1.

Referring now to FIG. 2, a schematic view of one embodiment of an electrical and control system 200 that may be used with the wind turbine 100 is illustrated. As shown, the rotor 106 includes the rotor blades 108 coupled to the hub 110. The rotor 106 also includes a low-speed shaft 112 rotatably coupled to the hub 110. The low-speed shaft 112 is coupled to a step-up gearbox 114 that is configured to step up the rotational speed of low-speed shaft 112 and transfer that speed to a high-speed shaft 116. In alternative embodiments, the wind turbine 100 may include a direct-drive generator that is rotatably coupled to the rotor 106 without any intervening gearbox. Further, as shown, the high-speed shaft 116 is rotatably coupled to the generator 118. In another embodiment, the generator 118 may be a wound rotor, three-phase, double-fed induction (asynchronous) generator (DFAG) that includes a generator stator 120 magnetically coupled to a generator rotor 122. In an alternative embodiment, the generator rotor 122 may include a plurality of permanent magnets in place of rotor windings.

Still referring to FIG. 2, the electrical and control system 200 may also include a turbine controller 202. The turbine controller 202 may include at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In one embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in one embodiment, additional input channels (not shown in FIG. 2) may be, but are not limited to, computer peripherals associated with an operator interface such as a mouse and a keyboard (neither shown in FIG. 2). Further, in one embodiment, additional output channels may include, but are not limited to, an operator interface monitor (not shown in FIG. 2).

Processors for the turbine controller 202 are configured to process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Referring still to FIG. 2, the generator stator 120 is electrically coupled to a stator synchronizing switch 206 via a stator bus 208. In one embodiment, to facilitate the DFIG configuration, the generator rotor 122 may be electrically coupled to a bi-directional power conversion assembly 210 via a rotor bus 212. Alternatively, the generator rotor 122 may be electrically coupled to the rotor bus 212 via any other device that facilitates operation of the system 200 as described herein. As a further alternative, the system 200 may be configured as a full power conversion system (not shown) known in the art, wherein a full power conversion assembly (not shown in FIG. 2), that is similar in design and operation to power conversion assembly 210, is electrically coupled to the generator stator 120, and such full power conversion assembly facilitates channeling electric power between the generator stator 120 and an electric power transmission and distribution grid 213. In certain embodiments, the stator bus 208 transmits three-phase power from the generator stator 120 to the stator synchronizing switch 206. The rotor bus 212 transmits three-phase power from the generator rotor 122 to the power conversion assembly 210. In another embodiment, the stator synchronizing switch 206 may be electrically coupled to a main transformer circuit breaker 214 via a system bus 216. In an alternative embodiment, one or more fuses (not shown) are used instead of the main transformer circuit breaker 214. In another embodiment, neither fuses nor the main transformer circuit breaker 214 are used.

In addition, as shown, the power conversion assembly 210 includes a rotor filter 218 that is electrically coupled to the generator rotor 122 via the rotor bus 212. A rotor filter bus 219 electrically couples the rotor filter 218 to a rotor-side power converter 220, and rotor-side power converter 220 is electrically coupled to a line-side power converter 222. The rotor-side power converter 220 and the line-side power converter 222 are power converter bridges including power semiconductors (not shown). In the illustrated embodiment, the rotor-side power converter 220 and the line-side power converter 222 are configured in a three-phase, pulse width modulation (PWM) configuration including insulated gate bipolar transistor (IGBT) switching devices (not shown in FIG. 2) that operate as known in the art. Alternatively, the rotor-side power converter 220 and the line-side power converter 222 may have any configuration using any switching devices that facilitate operation of the system 200 as described herein. Further, the power conversion assembly 210 may be coupled in electronic data communication with the turbine controller 202 to control the operation of the rotor-side power converter 220 and the line-side power converter 222.

In further embodiments, a line-side power converter bus 223 may electrically couple the line-side power converter 222 to a line filter 224. Also, as shown, a line bus 225 may electrically couple the line filter 224 to a line contactor 226. Moreover, as shown, the line contactor 226 may be electrically coupled to a conversion circuit breaker 228 via a conversion circuit breaker bus 230. In addition, the conversion circuit breaker 228 may be electrically coupled to main transformer circuit breaker 214 via system bus 216 and a connection bus 232. Alternatively, the line filter 224 may be electrically coupled to the system bus 216 directly via the connection bus 232 wherein any protection scheme (not shown) is configured to account for removal of the line contactor 226 and the conversion circuit breaker 228 from the system 200. The main transformer circuit breaker 214 may be electrically coupled to an electric power main transformer 234 via a generator-side bus 236. Further, the main transformer 234 may be electrically coupled to a grid circuit breaker 238 via a breaker-side bus 240. The grid circuit breaker 238 may be connected to electric power transmission and distribution grid 213 via a grid bus 242. In an alternative embodiment, the main transformer 234 may be electrically coupled to one or more fuses (not shown), rather than to the grid circuit breaker 238, via the breaker-side bus 240. In another embodiment, neither fuses nor the grid circuit breaker 238 is used, but rather the main transformer 234 may be coupled to the electric power transmission and distribution grid 213 via the breaker-side bus 240 and the grid bus 242.

In another embodiment, the rotor-side power converter 220 may be coupled in electrical communication with the line-side power converter 222 via a single direct current (DC) link 244. Alternatively, the rotor-side power converter 220 and the line-side power converter 222 may be electrically coupled via individual and separate DC links (not shown in FIG. 2). Further, as shown, the DC link 244 may include a positive rail 246, a negative rail 248, and at least one capacitor 250 coupled between the positive rail 246 and the negative rail 248. Alternatively, the capacitor 250 may include one or more capacitors configured in series or in parallel between the positive rail 246 and the negative rail 248.

The turbine controller 202 may also be configured to receive a plurality of voltage and electric current measurement signals from a first set of voltage and electric current sensors 252. Moreover, the turbine controller 202 may be configured to monitor and control at least some of the operational variables associated with the wind turbine 100. In particular embodiments, each of three voltage and electric current sensors 252 may be electrically coupled to each one of the three phases of grid bus 242. Alternatively, the voltage and electric current sensors 252 are electrically coupled to the system bus 216. As a further alternative, the voltage and electric current sensors 252 may be electrically coupled to any portion of the system 200 that facilitates operation of the system 200 as described herein. As a still further alternative, the turbine controller 202 is configured to receive any number of voltage and electric current measurement signals from any number of the voltage and electric current sensors 252, including, but not limited to, one voltage and electric current measurement signal from one transducer.

Referring still to FIG. 2, the system 200 also includes a converter controller 262 that is configured to receive a plurality of voltage and electric current measurement signals from a second set of voltage and electric current sensors 254 coupled in electronic data communication with the stator bus 208, a third set of voltage and electric current measurement signals from a third set of voltage and electric current sensors 256 coupled in electronic data communication with the rotor bus 212, and a fourth set of voltage and electric current measurement signals from a fourth set of voltage and electric current sensors 264 coupled in electronic data communication with the conversion circuit breaker bus 230. The second set of voltage and electric current sensors 254 may be substantially similar to the first set of voltage and electric current sensors 252, and the fourth set of voltage and electric current sensors 264 may be substantially similar to the third set of voltage and electric current sensors 256. Further, the converter controller 262 may be substantially similar to the turbine controller 202 and may be coupled in electric data communication with the turbine controller 202. Moreover, the converter controller 262 may be physically integrated within the power conversion assembly 210. Alternatively, the converter controller 262 may have any configuration that facilitates operation of the system 200 as described herein.

In another embodiment, the electric power transmission and distribution grid 213 may include one or more transmission lines 270 (only one shown for clarity) that are coupled to the grid bus 242 via a grid coupling 272. The transmission lines 270 and/or the electric power transmission and distribution grid 213 may include one or more series compensation elements 274, such as one or more capacitors, to facilitate reducing reactive power losses within the transmission lines 270. As described herein, the series compensation elements 274 may create one or more sub-synchronous resonances within electric power transmission and distribution grid 213. Further, the transmission lines 270 and/or the electric power transmission and distribution grid 213 may also include one or more switches 276 coupled to each series compensation element 274. The switches 276 couple and decouple the series compensation elements 274 to and from the electric power transmission and distribution grid 213, respectively, as desired. More specifically, the switches 276 may be opened to couple the series compensation elements 274 to the electric power transmission and distribution grid 213, and the switches 276 may also be closed to decouple the series compensation elements 274 from the electric power transmission and distribution grid 213. The electric power transmission and distribution grid 213 may also be operatively coupled to one or more loads 278 for providing power to loads 278.

During operation, wind impacts the rotor blades 108 and the blades 108 transform wind energy into a mechanical rotational torque that rotatably drives the low-speed shaft 112 via the hub 110. The low-speed shaft 112 drives the gearbox 114 that subsequently steps up the low rotational speed of the low-speed shaft 112 to drive the high-speed shaft 116 at an increased rotational speed. The high-speed shaft 116 rotatably drives the generator rotor 122. A rotating magnetic field is induced by the generator rotor 122 and a voltage is induced within the generator stator 120 that is magnetically coupled to the generator rotor 122. The generator 118 converts the rotational mechanical energy to a sinusoidal, three-phase alternating current (AC) electrical energy signal in the generator stator 120. The associated electrical power is transmitted to the main transformer 234 via the stator bus 208, the stator synchronizing switch 206, the system bus 216, the main transformer circuit breaker 214 and the generator-side bus 236. The main transformer 234 steps up the voltage amplitude of the electrical power and the transformed electrical power is further transmitted to the electric power transmission and distribution grid 213 via the breaker-side bus 240, the grid circuit breaker 238, and the grid bus 242.

In certain embodiments, a second electrical power transmission path is provided. Electrical, three-phase, sinusoidal, AC power is generated within the generator rotor 122 and is transmitted to the power conversion assembly 210 via the rotor bus 212. Within the power conversion assembly 210, the electrical power is transmitted to the rotor filter 218 wherein the electrical power is modified for the rate of change of the output voltage associated with the rotor-side power converter 220. The rotor-side power converter 220 acts as a rectifier and rectifies the sinusoidal, three-phase AC power to DC power. The DC power is transmitted into the DC link 244. The capacitor 250 facilitates mitigating DC link voltage amplitude variations by facilitating mitigation of a DC ripple associated with AC rectification.

The DC power is subsequently transmitted from the DC link 244 to the line-side power converter 222 wherein the line-side power converter 222 acts as an inverter configured to convert the DC electrical power from the DC link 244 to three-phase, sinusoidal AC electrical power with pre-determined voltages, currents, and frequencies. This conversion is monitored and controlled via the converter controller 262. The converted AC power is transmitted from the line-side power converter 222 to the system bus 216 via the line-side power converter bus 223 and the line bus 225, the line contactor 226, the conversion circuit breaker bus 230, the conversion circuit breaker 228, and the connection bus 232. The line filter 224 compensates or adjusts for harmonic currents in the electric power transmitted from the line-side power converter 222. The stator synchronizing switch 206 is configured to close to facilitate connecting the three-phase power from the generator stator 120 with the three-phase power from the power conversion assembly 210.

The conversion circuit breaker 228, the main transformer circuit breaker 214, and the grid circuit breaker 238 are configured to disconnect corresponding buses, for example, when current flow is excessive and can damage the components of the system 200. Additional protection components may also be provided, including the line contactor 226, which may be controlled to form a disconnect by opening a switch (not shown in FIG. 2) corresponding to each of the lines of the line bus 225.

The power conversion assembly 210 compensates or adjusts the frequency of the three-phase power from the generator rotor 122 for changes, for example, in the wind speed at the hub 110 and the rotor blades 108. Therefore, in this manner, mechanical and electrical rotor frequencies are decoupled from stator frequency.

Under some conditions, the bi-directional characteristics of the power conversion assembly 210, and specifically, the bi-directional characteristics of the rotor-side power converter 220 and the line-side power converter 222, facilitate feeding back at least some of the generated electrical power into the generator rotor 122. More specifically, electrical power is transmitted from the system bus 216 to the connection bus 232 and subsequently through the conversion circuit breaker 228 and the conversion circuit breaker bus 230 into the power conversion assembly 210. Within the power conversion assembly 210, the electrical power is transmitted through the line contactor 226, the line bus 225, and the line-side power converter bus 223 into the line-side power converter 222. The line-side power converter 222 acts as a rectifier and rectifies the sinusoidal, three-phase AC power to DC power. The DC power is transmitted into the DC link 244. The capacitor 250 facilitates mitigating the DC link 244 voltage amplitude variations by facilitating mitigation of a DC ripple sometimes associated with three-phase AC rectification.

The DC power is subsequently transmitted from the DC link 244 to the rotor-side power converter 220 wherein the rotor-side power converter 220 acts as an inverter configured to convert the DC electrical power transmitted from the DC link 244 to a three-phase, sinusoidal AC electrical power with pre-determined voltages, currents, and frequencies. This conversion is monitored and controlled via the converter controller 262. The converted AC power is transmitted from the rotor-side power converter 220 to the rotor filter 218 via the rotor filter bus 219 and is subsequently transmitted to the generator rotor 122 via the rotor bus 212, thereby facilitating sub-synchronous operation.

The power conversion assembly 210 is configured to receive control signals from the turbine controller 202. The control signals are based on sensed conditions or operating characteristics of the wind turbine 100 and the electrical and control system 200, received by the turbine controller 202 and used to control operation of the power conversion assembly 210. Feedback from sensors may be used by the system 200 to control the power conversion assembly 210 via the converter controller 262 including, for example, the conversion circuit breaker bus 230, stator bus and rotor bus voltages or current feedbacks via the second set of voltage and electric current sensors 254, the third set of voltage and electric current sensors 256, and the fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, the converter controller 262 can at least temporarily substantially suspend the IGBTs from conducting within the line-side power converter 222. Such suspension of operation of the line-side power converter 222 can substantially mitigate electric power being channeled through the power conversion assembly 210 to approximately zero.

Figure 3:
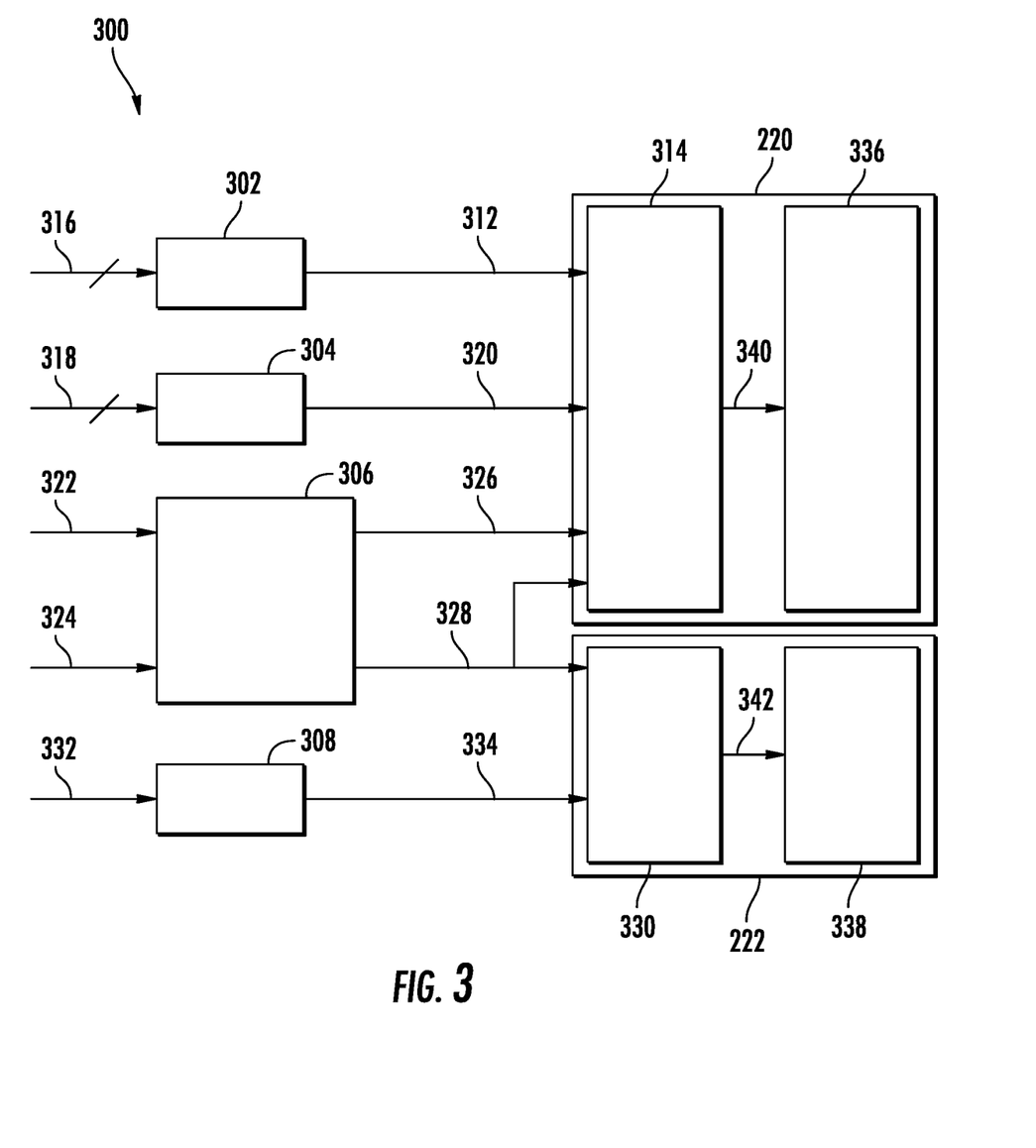
FIG. 3 illustrates a block diagram of one embodiment of a power converter system according to the present disclosure that may be used with the electrical and control system shown in FIG. 2.

Referring now to FIG. 3, a schematic diagram of one embodiment of a power converter system 300 that may be used with the electrical and control system 200 (shown in FIG. 2) is illustrated. As shown, the power converter system 300 includes the rotor-side power converter 220 and the line-side power converter 222. Further, as shown, the power converter system 300 also includes a torque regulator 302, a reactive power regulator 304 (also referred to herein as a voltage/VAR regulator), a synchronizing phase-locked loop (PLL) 306, and a DC voltage regulator 308.

As such, the torque regulator 302 is configured to transmit a first rotor current command signal 312 to the rotor-side power converter 220, and more specifically, to a rotor converter control module 314 thereof. In such embodiments, the first rotor current command signal 312 can be used to adjust a rotor current based on a desired generator torque command signal 316 received from the turbine controller 202 (shown in FIG. 2). Further, as shown, the reactive power regulator 304 is configured to receive a stator voltage and reactive power command signal 318 from the turbine controller 202 and transmit a second rotor current command signal 320 to the rotor converter control module 314. As such, the second rotor current command signal 320 can be used to control a power factor of the generator 118 by adjusting a ratio of real power to reactive power of the generator 118. In certain embodiments, the torque regulator 302 and the reactive power regulator 304 may be housed within the converter controller 262. In an alternative embodiment, the torque regulator 302 and/or the reactive power regulator 304 may be housed within any other suitable controller, such as the turbine controller 202.

The synchronizing PLL 306 is configured to receive a rotor position feedback signal 322 from a rotor position sensor (not shown) and a stator voltage feedback signal 324 from the second set of voltage and electric current sensors 254 (shown in FIG. 2). As such, the synchronizing PLL 306 is configured to determine a transformation angle signal 326 and a reference angle signal 328 that can be used to transform rotor voltages and rotor currents between two or more signal reference frames, such as a time-based reference frame and a phasor-based reference frame. In one embodiment, the transformation angle signal 326 and the reference angle signal 328 can be used to transform rotor voltages and rotor currents to one or more phasors that include X and Y components of the rotor voltages and/or rotor currents. As used herein, an X component refers to a real component of a phasor, and a Y component refers to an imaginary component of a phasor. The transformation angle signal 326 and the reference angle signal 328 can be transmitted to the rotor converter control module 314 and to a line converter control module 330 that is positioned within line-side power converter 222.

Still referring to FIG. 3, the DC voltage regulator 308 receives a DC voltage reference signal 332 that is set, for example, during wind turbine commissioning, and transmits a line current command signal 334 to the line converter control module 330. The line current command signal 334 is used to adjust a DC voltage of the DC link 244 (shown in FIG. 2).

The rotor converter control module 314 is coupled to a rotor converter switching array 336, and the line converter control module 330 is coupled to a line converter switching array 338. In one embodiment, the rotor converter switching array 336 and the line converter switching array 338 each includes a plurality of IGBT switching devices (not shown). Alternatively, the rotor converter switching array 336 and/or the line converter switching array 338 may include any suitable switching devices that enable the rotor-side power converter 220 and the line-side power converter 222 to operate as described herein. In one embodiment, the rotor converter control module 314 and the line converter control module 330 may use pulse-width modulation to control a duty cycle of a rotor converter switch control signal 340 and of a line converter switch control signal 342, respectively. The rotor converter switch control signal 340 controls a switching behavior of the rotor converter switching array 336, and the line converter switch control signal 342 controls a switching behavior of the line converter switching array 338. As such, the rotor converter switching array 336 and the line converter switching array 338 may be controlled to produce one or more desired rotor and/or stator voltage and/or current characteristics.

Although not shown in FIG. 3, one or more control components of the power converter system 300 may receive one or more feedback signals to facilitate maintaining proper operation of the power converter system 300. Such feedback signals include, without limitation, a DC voltage signal, a three-phase rotor current signal (such as from the third set of voltage and electric current sensors 256), a three-phase stator current signal (such as from the second set of voltage and electric current sensors 254), a three-phase line current signal (such as from the fourth set of voltage and electric current sensors 264), a three-phase stator voltage signal (such as from the second set of voltage and electric current sensors 254), and/or a rotor position signal.

Figure 4:
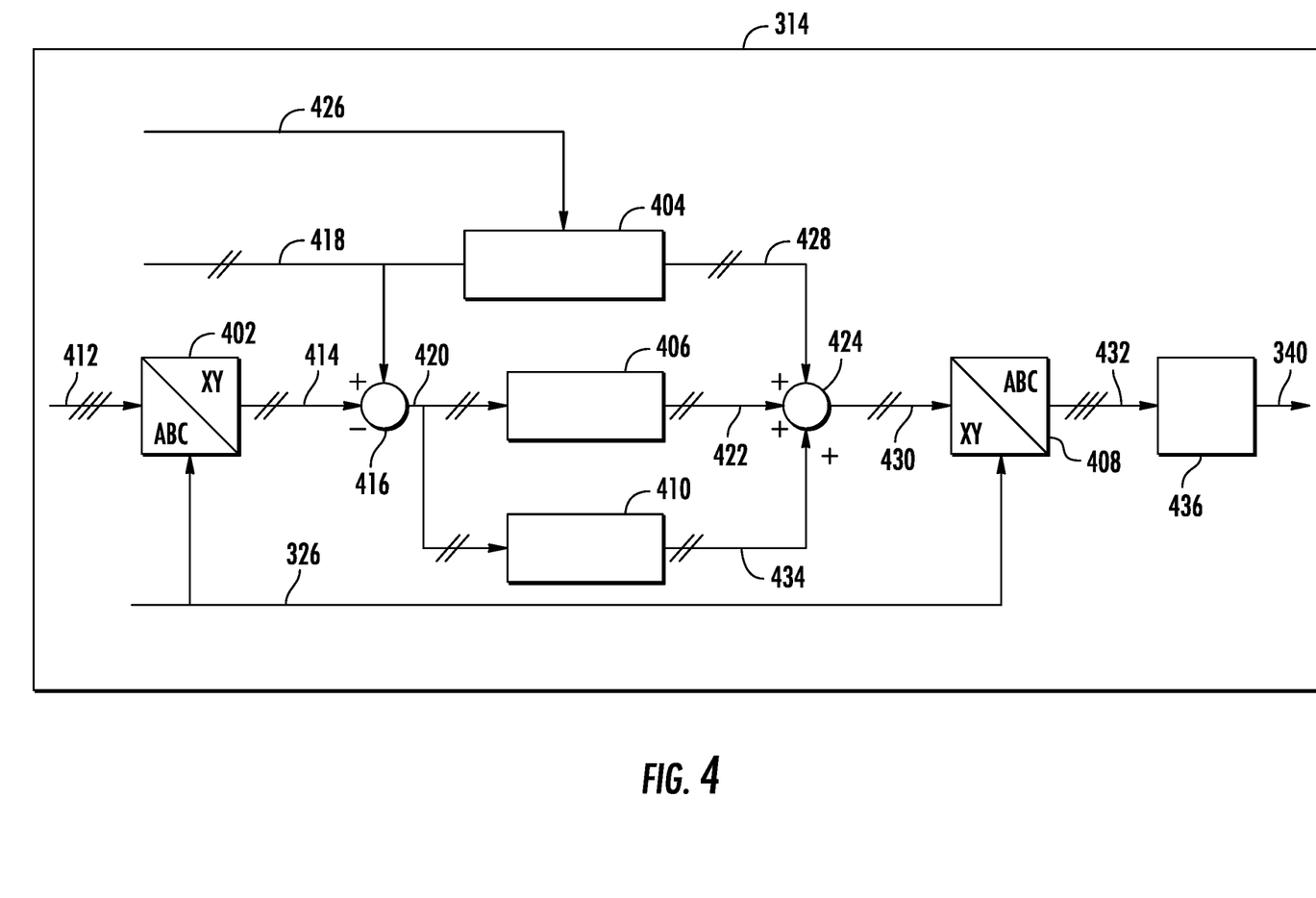
FIG. 4 illustrates a block diagram of one embodiment of a rotor converter control module according to the present disclosure that may be used with the power converter system shown in FIG. 3.

Referring now to FIG. 4, a schematic diagram of one embodiment of a rotor converter control module 314 that may be used with power converter system 300 (shown in FIG. 3) is illustrated. As shown, in an embodiment, the rotor converter control module 314 includes a current transform module 402, an impedance feedforward module 404, a regulator module 406 (as referred to herein as a voltage/VAR regulator), a voltage transform module 408, and a current damping device 410 (also referred to herein as a current regulator).

The current transform module 402 receives a current feedback signal 412 that includes current measurements from third set of electric current sensors 256 (shown in FIG. 2) of each phase of rotor bus 212 (shown in FIG. 2). In the exemplary embodiment, the current feedback signal 412 includes one or more current components from electric power transmission and distribution grid 213 via power converter system 300 and/or via generator 118 (shown in FIG. 2). In one embodiment, one or more current components may include, for example, one or more sub-synchronous current frequency components and/or one or more grid frequency components that substantially conforms to a frequency of electric power transmission and distribution grid 213. Further, the current transform module 402 receives transformation angle signal 326 and transforms the three-phase instantaneous currents of current feedback signal 412 into a phasor-based reference frame. The current transform module 402 transmits a current feedback phasor 414 to a current feedback comparator 416. The current feedback comparator 416 receives a current command phasor 418, which includes first rotor current command signal 312 and second rotor current command signal 320 (both shown in FIG. 2), and calculates a difference between the current feedback phasor 414 and the current command phasor 418. The current feedback comparator 416 transmits the resulting difference as a current error phasor 420 to regulator module 406 and to current damping device 410.

Still referring to FIG. 4, the regulator module 406 receives the current error phasor 420 and performs proportional plus integral feedback regulation to adjust an output of the regulator module 406 to facilitate reducing an error of the current error phasor 420 to substantially 0. Further, as shown, the regulator module 406 transmits a resulting regulator output phasor 422, which is a voltage phasor signal, to a regulator adder 424.

The impedance feedforward module 404 receives current command phasor 418 and a slip frequency signal 426. The impedance feedforward module 404 computes an amplitude of a feedforward command phasor 428 as a feedforward voltage phasor signal to supplement a closed-loop current regulation of the regulator module 406.

In the exemplary embodiment, the current damping device 410 receives current error phasor 420 and facilitates reducing an amplitude of one or more current frequency components represented by the current error phasor 420. In the exemplary embodiment, the one or more current frequency components are sub-synchronous to a current frequency of electric power transmission and distribution grid 213 (shown in FIG. 2). As used herein, the term "sub-synchronous" refers to a frequency that is less than a reference frequency, and in certain embodiments, a frequency that is less than the frequency of electric power transmission and distribution grid 213. The current damping device 410 transmits a resulting damping control phasor 434, which is a voltage phasor signal, to regulator adder 424.

The regulator adder 424 combines the regulator output phasor 422, the feedforward command phasor 428, and the damping control phasor 434, and transmits a resulting voltage command phasor 430 to the voltage transform module 408. The voltage transform module 408 transforms the voltage command phasor 430 to a time-based reference frame using transformation angle signal 326, and outputs a resulting three-phase sinusoidal voltage command signal 432. The voltage command signal 432 is modulated by a pulse-width modulation (PWM) module 436. The PWM module 436 transmits rotor converter switch control signal 340 to rotor converter switching array 336 (shown in FIG. 2) to control a switching operation, such as a duty cycle, of the switching devices within the rotor converter switching array 336.

Figure 5:
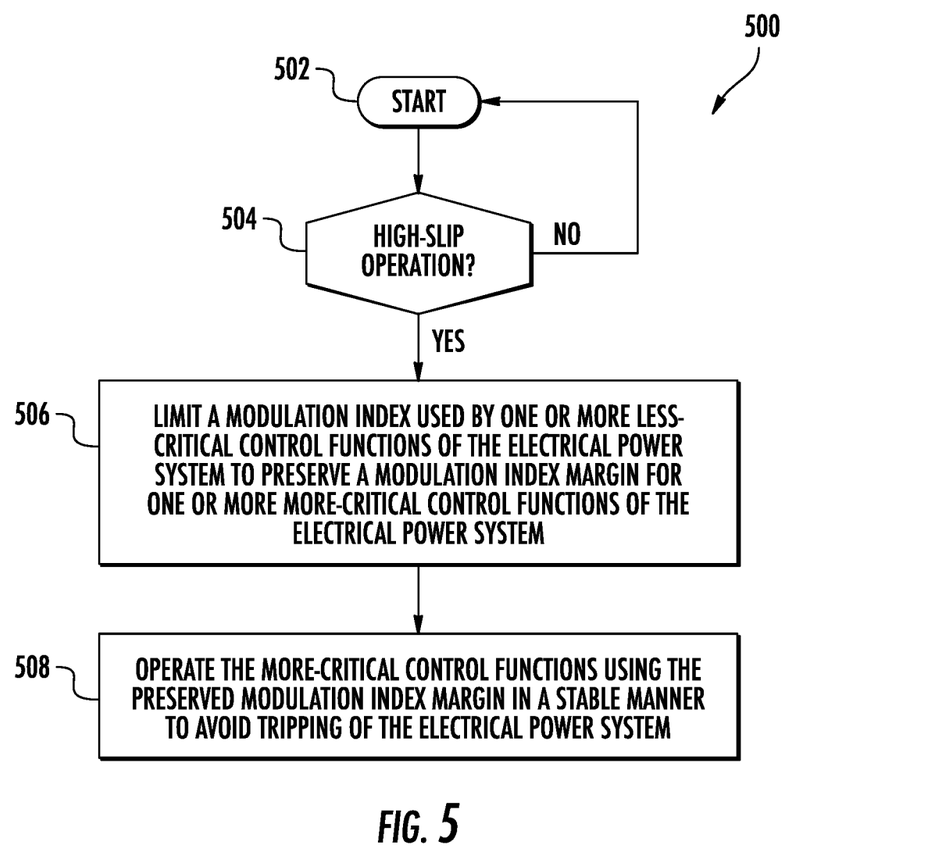
FIG. 5 illustrates a flow chart of one embodiment of a method for controlling an electrical power system connected to an electrical grid during high-slip operation according to the present disclosure.

Referring now to FIG. 5, a flow diagram of one embodiment of a method 500 for controlling an electrical power system connected to an electrical grid, such as a wind turbine power system, is illustrated. In general, the method 500 will be described herein with reference to the wind turbine 100 and control system 200 shown in FIGS. 1-4 and 6. However, it should be appreciated that the disclosed method 500 may be implemented with rotor blades having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (502), the method 500 starts. As shown at (504), the method 500 includes determining whether the electrical power system is experiencing high-slip operation. As used herein, "high-slip operation" generally refers to operation at which the speed of the electrical power system is very high or very low, resulting in a large deviation from the synchronous speed. In one embodiment, for example, high-slip operation may refer to operation at or above about 125% synchronous speed or at or below about 75% synchronous speed. If the electrical power system is experiencing high-slip operation, as shown at (506), the method 500 includes, during the high-slip operation, limiting a modulation index used by one or more less-critical control functions of the electrical power system to preserve a modulation index margin for one or more more-critical control functions of the electrical power system. As shown at (508), the method 500 includes, during the high-slip operation, operating the more-critical control functions using the preserved modulation index margin in a stable manner to avoid overmodulation of the electrical power system.

In an embodiment, for example, the less-critical control function(s) of the electrical power system may include, for example, harmonics, DC current, and/or sub-synchronous control interaction (SSCI) stability. In another embodiment, for example, the more-critical control function(s) of the electrical power system may include, for example, speed and/or torque. Moreover, in generally, more-critical control function(s) generally refer to control functions that allow the electrical power system to operate in a stable manner at high slips without tripping.

Figure 6:
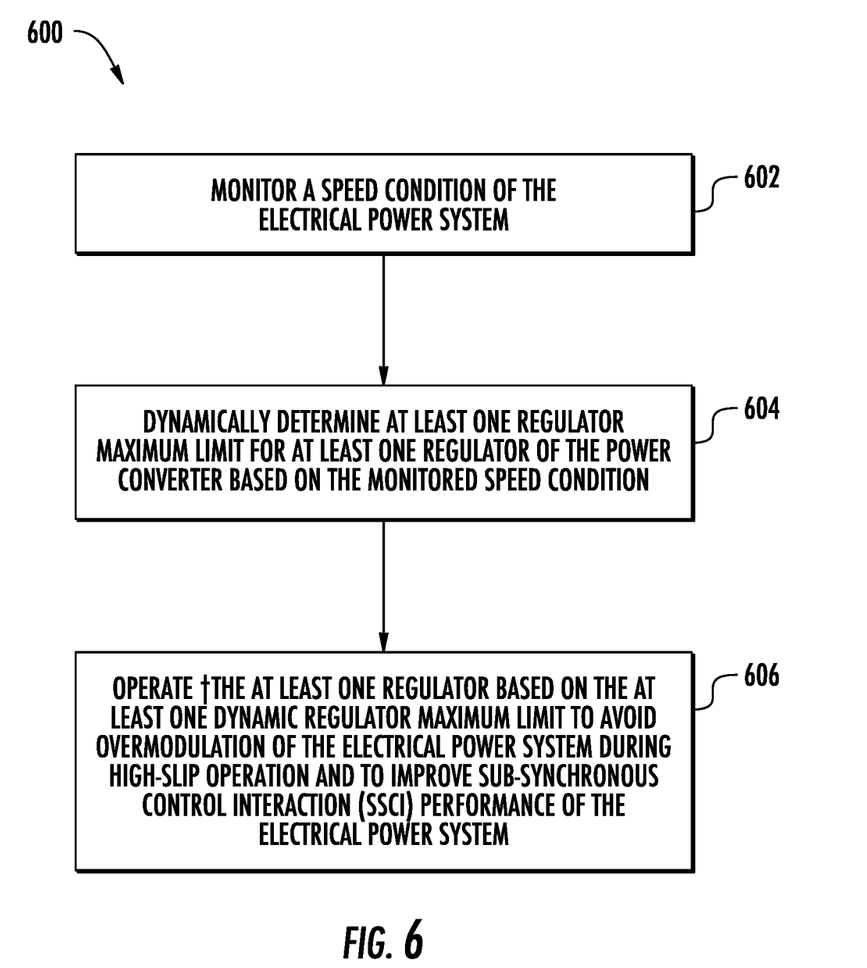
FIG. 6 illustrates a flow chart of one embodiment of a method for controlling an electrical power system connected to an electrical grid according to the present disclosure.

Referring now to FIG. 6, a flow diagram of one embodiment of a method 600 for controlling an electrical power system connected to an electrical grid, such as a wind turbine power system, is illustrated. In general, the method 600 will be described herein with reference to the wind turbine 100 and control system 200 shown in FIGS. 1-4 and 6. However, it should be appreciated that the disclosed method 600 may be implemented with rotor blades having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 includes monitoring a speed condition of the electrical power system. For example, in an embodiment, the speed condition of the electrical power system may include a rotor speed of the rotor 106 of the wind turbine power system 200. Further, in an embodiment, the method 500 may include filtering the rotor speed of the wind turbine power system 200.

As shown at (604), the method 600 includes dynamically determining at least one regulator maximum limit for at least one regulator of the power converter based on the monitored speed condition. As shown at (606), the method 600 includes operating the regulator(s) based on the dynamic regulator maximum limit(s), e.g., to avoid overmodulation and/or issues associated with overmodulation, to avoid tripping of the electrical power system during high-slip operation, and/or to improve sub-synchronous control interaction (SSCI) performance of the electrical power system. As used herein, and as mentioned, SSCIs are a phenomenon that occurs when power-electronic converter controls interact with series-compensated transmission lines.

Figure 7:
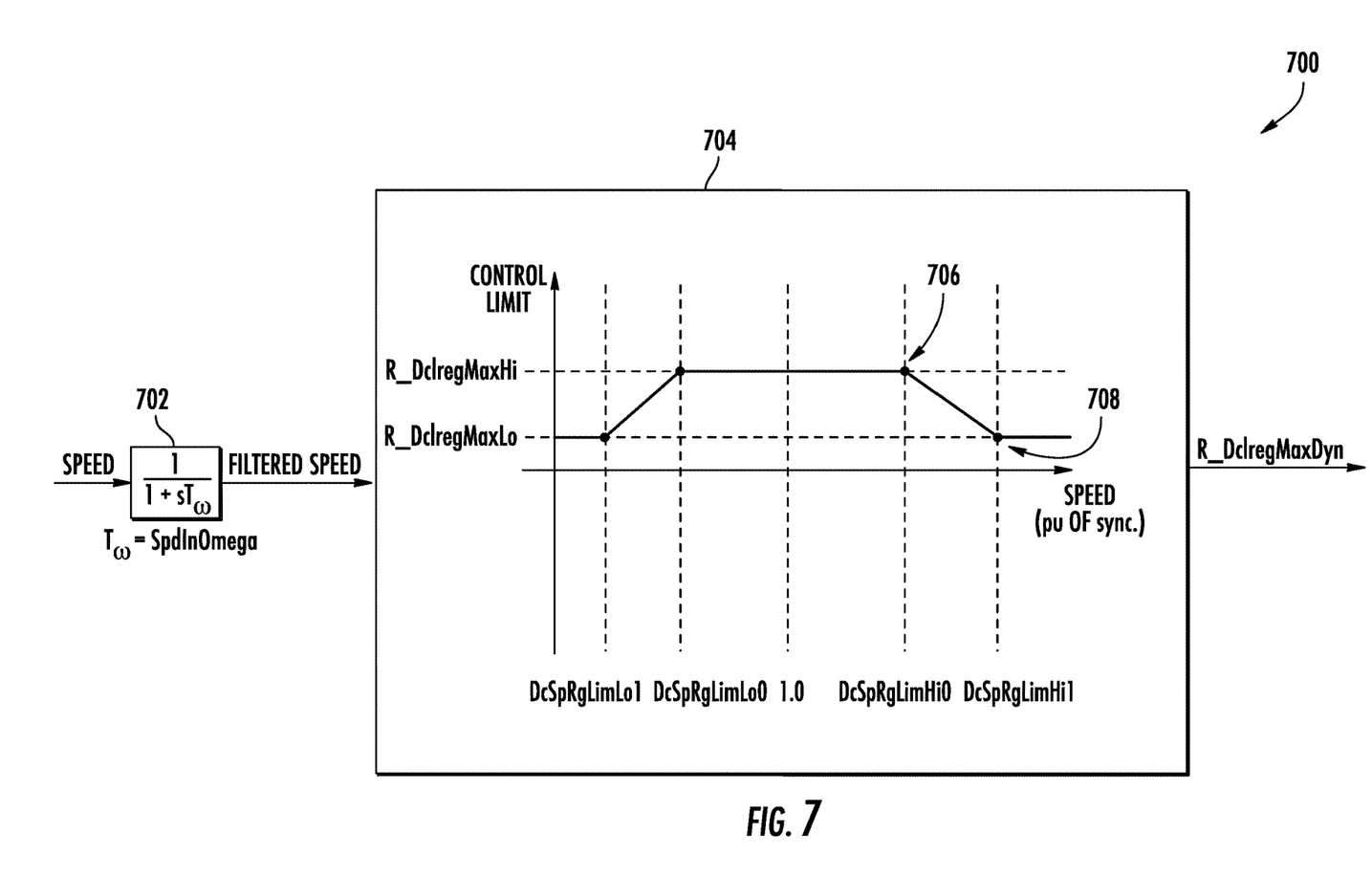
FIG. 7 illustrates a schematic diagram of one embodiment of a control module of a controller for dynamically determining at least one regulator maximum limit for at least one regulator of a power converter based on the monitored speed condition according to the present disclosure.

The method 600 of FIG. 6 can be better understood with reference to FIG. 7. As shown particularly in FIG. 7, a schematic diagram of one embodiment of a control module 700 of a controller, such as the converter controller 262, according to the present disclosure is illustrated. More specifically, as shown, the control module 700 is configured to receive a speed of the wind turbine power system 200, such as rotor speed. As shown at 702, the control module 700 may then filter the rotor speed via a filter. Such filtering, for example, may reduce and/or eliminate noise and is also configured to slow down the input. Thus, as shown, the filtered rotor speed is received by a regulator limit module 704. More specifically, in an embodiment, the regulator limit module 704 is configured to dynamically determine a current regulator maximum limit (e.g., a maximum limit for the DC component of the AC current on the rotor/stator that is part of the current regulators on the rotor-side power converter 220, R_DcIregMaxDyn) of the current regulator (i.e., the current damping module 410) of the power converter 210 based on the monitored speed condition. For example, as shown, in an embodiment, the regulator limit module 704 may include a graph of the control limit (y-axis) versus the speed (x-axis) with high and low maximum values (e.g., R_DcIregMaxHi and R_DcIregMaxLo) for the current regulator maximum limit being set. Thus, the current regulator maximum limit (e.g., R_DcIregMaxDyn) can be dynamically selected based on the filtered rotor speed. In particular, as shown, as the rotor speed approaches a synchronous speed (i.e., labeled 1.0 in FIG. 6) of the generator 118 of the wind turbine power system 200, the regulator limit module 704 may select an increased current regulator maximum limit (as shown at 706) to improve the SSCI performance of the wind turbine power system 200.

In addition, or in the alternative, as the rotor speed moves away from the synchronous speed of the generator 118 of the wind turbine power system 200, the regulator limit module 704 may select a decreased current regulator maximum limit of the current regulator, as shown at 708.

In still another embodiment, a control module of a controller, such as the converter controller 262, may be configured to receive a speed of the wind turbine power system 200, such as rotor speed. As mentioned, the rotor speed may also be filtered. Thus, the filtered rotor speed is received by a regulator limit module that is configured to dynamically determine a regulator maximum limit of the voltage/VAR regulator (i.e., the reactive power regulator 304) of the power converter 210 based on the monitored speed condition. Thus, this parameter is part of a modulation index limiting or field weakening logic of the voltage/VAR regulator of the power converter 210. As used herein, the current regulator maximum limit directly impacts the modulation index, whereas the regulator maximum limit of the voltage/VAR regulator is the limit on a voltage regulator command which indirectly impacts the modulation index. As used herein, the modulation index generally refers to a ratio of a voltage command of the power converter 210 to an available voltage, wherein the available voltage is typically dictated by the DC voltage.

For example, in an embodiment, the regulator limit module may include a graph of the control limit (y-axis) versus the speed (x-axis) with high and low maximum values for the voltage/VAR regulator being set. Thus, the regulator maximum limit can be dynamically selected based on the filtered rotor speed. In particular, as shown, as the rotor speed approaches a synchronous speed of the generator 118 of the wind turbine power system 200, the regulator limit module may select an increased regulator maximum limit to improve the SSCI performance of the wind turbine power system 200. In addition, or in the alternative, as the rotor speed moves away from the synchronous speed of the generator 118 of the wind turbine power system 200, the regulator limit module may select a decreased regulator maximum limit of the voltage/VAR regulator.

In further embodiments, limiting the modulation index used by the one or more less-critical control functions of the electrical power system to preserve the modulation index margin for the more-critical control function(s) of the electrical power system may include decreasing the at least one regulator maximum limit of the regulator(s) as the rotor speed moves away from a synchronous speed of the generator of the electrical power system. In additional embodiments, operating the more-critical control function(s) using the preserved modulation index margin in the stable manner to avoid overmodulation of the electrical power system may include increasing the regulator maximum limit(s) to improve the SSCI performance of the wind turbine power system 200 as the speed condition approaches a synchronous speed of the generator of the wind turbine power system 200.

Exemplary embodiments of a wind turbine, power converter, and methods of converting power are described above in detail. The methods, wind turbine, and power converter are not limited to the specific embodiments described herein, but rather, components of the wind turbine, components of the power converter, and/or steps of the methods may be utilized independently and separately from other components and/or steps described herein. For example, the power converter and methods may also be used in combination with other wind turbine power systems and methods, and are not limited to practice with only the power system as described herein. Rather, one embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

Further aspects of the invention are provided by the subject matter of the following clauses:

Clause 1. A method for controlling an electrical power system connected to an electrical grid, the electrical power system having a generator and a power converter, the method comprising:
monitoring a speed condition of the electrical power system;
dynamically determining at least one regulator maximum limit for at least one regulator of the power converter based on the monitored speed condition; and
operating the at least one regulator based on the at least one dynamic regulator maximum limit to avoid overmodulation of the electrical power system during high-slip operation and to improve sub-synchronous control interaction (SSCI) performance of the electrical power system.

Clause 2. The method of clause 1, wherein the at least one regulator of the power converter comprises at least one of a current regulator or a voltage/VAR regulator of the power converter.

Clause 3. The method of any of the preceding clauses, wherein the electrical power system comprises a wind turbine power system.

Clause 4. The method of clause 3, wherein the speed condition of the electrical power system comprises a rotor speed of a rotor of the wind turbine power system.

Clause 5. The method of clause 4, further comprising filtering the rotor speed of the wind turbine power system.

Clause 6. The method of clauses 4-5, wherein dynamically determining at least one regulator maximum limit for at least one regulator of the power converter based on the monitored speed condition further comprises:
as the rotor speed approaches a synchronous speed of the generator of the wind turbine power system, increasing the at least one regulator maximum limit to improve the SSCI performance of the wind turbine power system.

Clause 7. The method of clause 6, dynamically determining at least one regulator maximum limit for at least one regulator of the power converter based on the monitored speed condition further comprises:
as the rotor speed moves away from the synchronous speed of the generator of the wind turbine power system, decreasing the at least one regulator maximum limit of the at least one regulator.

Clause 8. An electrical power system connected to an electrical grid, the electrical power system comprising:
a doubly-fed asynchronous generator (DFAG);
a power converter coupled to the DFAG, the power converter configured to convert a frequency of generated electric power from the DFAG to a frequency substantially similar to a frequency of the electrical grid; and
a controller configured to perform a plurality of operations, the plurality of operations comprising:
monitoring a speed condition of the electrical power system;
dynamically determining at least one regulator maximum limit for at least one regulator of the power converter based on the monitored speed condition; and
operating the at least one regulator based on the at least one dynamic regulator maximum limit to avoid overmodulation of the electrical power system during high-slip operation and to improve sub-synchronous control interaction (SSCI) performance of the electrical power system.

Clause 9. The electrical power system of clause 8, wherein the at least one regulator of the power converter comprises at least one of a current regulator or a voltage/VAR regulator of the power converter.

Clause 10. The electrical power system of clauses 8-9, wherein the electrical power system comprises a wind turbine power system.

Clause 11. The electrical power system of clause 10, wherein the speed condition of the electrical power system comprises a rotor speed of a rotor of the wind turbine power system.

Clause 12. The electrical power system of clause 11, further comprising filtering the rotor speed of the wind turbine power system.

Clause 13. The electrical power system of clauses 11-12, wherein dynamically determining at least one regulator maximum limit for at least one regulator of the power converter based on the monitored speed condition further comprises:
as the rotor speed approaches a synchronous speed of the generator of the wind turbine power system, increasing the at least one regulator maximum limit to improve the SSCI performance of the wind turbine power system.

Clause 14. The electrical power system of clause 13, dynamically determining at least one regulator maximum limit for at least one regulator of the power converter based on the monitored speed condition further comprises:
as the rotor speed moves away from the synchronous speed of the generator of the wind turbine power system, decreasing the at least one regulator maximum limit of the at least one regulator.

Clause 15. A method for controlling an electrical power system connected to an electrical grid during high-slip operation, the electrical power system having a generator and a power converter, the method comprising:

during the high-slip operation, limiting a modulation index used by one or more less-critical control functions of the electrical power system to preserve a modulation index margin for one or more more-critical control functions of the electrical power system; and during the high-slip operation, operating the one or more more-critical control functions using the preserved modulation index margin in a stable manner to avoid overmodulation of the electrical power system.

Clause 16. The method of clause 15, wherein the one or more less-critical control functions of the electrical power system comprise at least one of harmonics, DC current, or sub-synchronous control interaction (SSCI) stability.

Clause 17. The method of clauses 15-16, wherein the one or more more-critical control functions of the electrical power system comprise at least one of speed or torque.

Clause 18. The method of clauses 15-17, wherein limiting the modulation index used by the one or more less-critical control functions of the electrical power system to preserve the modulation index margin for the one or more more-critical control functions of the electrical power system further comprises:

decreasing at least one regulator maximum limit of at least one regulator as a speed condition of the electrical power system moves away from a synchronous speed of the generator of the electrical power system.

Clause 19. The method of clause 18, wherein operating the one or more more-critical control functions using the preserved modulation index margin in the stable manner to avoid overmodulation of the electrical power system further comprises:

increasing the at least one regulator maximum limit to improve sub-synchronous control interaction (SSCI) performance of the electrical power system as the speed condition approaches a synchronous speed of the generator of the electrical power system.

Clause 20. The method of clauses 15-19, wherein the electrical power system comprises a wind turbine power system, the speed condition of the electrical power system comprising a rotor speed of a rotor of the wind turbine power system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electrical power system connected to an electrical grid, the electrical power system having a generator and a power converter, the method comprising:

determining whether the electrical power system is operating in a high-slip operation mode;

when the electrical power system is operating in the high-slip operation mode, monitoring a speed condition of the electrical power system;

dynamically determining at least one regulator maximum limit for at least one regulator of the power converter based on the monitored speed condition, wherein the at least one regulator maximum limit limits a modulation index used by one or more less-critical control functions of the electrical power system during the high-slip operation mode to preserve a modulation index margin for one or more more-critical control functions; and operating the at least one regulator based on the at least one dynamic regulator maximum limit to avoid overmodulation of the electrical power system during the high-slip operation mode and to improve sub-synchronous control interaction (SSCI) performance of the electrical power system.

2. The method of claim 1, wherein the at least one regulator of the power converter comprises at least one of a current regulator or a voltage/VAR regulator of the power converter.

3. The method of claim 1, wherein the electrical power system comprises a wind turbine power system.

4. The method of claim 3, wherein the speed condition of the electrical power system comprises a rotor speed of a rotor of the wind turbine power system.

5. The method of claim 4, further comprising filtering the rotor speed of the wind turbine power system.

6. The method of claim 4, wherein dynamically determining at least one regulator maximum limit for at least one regulator of the power converter based on the monitored speed condition further comprises:

as the rotor speed approaches a synchronous speed of the generator of the wind turbine power system, increasing the at least one regulator maximum limit to improve the SSCI performance of the wind turbine power system.

7. The method of claim 6, dynamically determining at least one regulator maximum limit for at least one regulator of the power converter based on the monitored speed condition further comprises:

as the rotor speed moves away from the synchronous speed of the generator of the wind turbine power system, decreasing the at least one regulator maximum limit of the at least one regulator.

8. The electrical power system of claim 1, wherein the one or more less-critical control functions of the electrical power system comprise at least one of harmonics, DC current, or sub-synchronous control interaction (SSCI) stability.

9. The electrical power system of claim 1, wherein the one or more more-critical control functions of the electrical power system comprise at least one of speed or torque.

10. An electrical power system connected to an electrical grid, the electrical power system comprising:

a doubly-fed asynchronous generator (DFAG);

a power converter coupled to the DFAG, the power converter configured to convert a frequency of generated electric power from the DFAG to a frequency substantially similar to a frequency of the electrical grid; and a controller configured to perform a plurality of operations, the plurality of operations comprising:

determining whether the electrical power system is operating in a high-slip operation mode;

when the electrical power system is operating in the high-slip operation mode, monitoring a speed condition of the electrical power system;

dynamically determining at least one regulator maximum limit for at least one regulator of the power converter based on the monitored speed condition, wherein the at least one regulator maximum limit limits a modulation index used by one or more less-critical control functions of the electrical power system during the high-slip operation mode to preserve a modulation index margin for one or more more-critical control functions; and
operating the at least one regulator based on the at least one dynamic regulator maximum limit to avoid overmodulation of the electrical power system during the high-slip operation mode and to improve sub-synchronous control interaction (SSCI) performance of the electrical power system.

11. The electrical power system of claim 10, wherein the at least one regulator of the power converter comprises at least one of a current regulator or a voltage/VAR regulator of the power converter.

12. The electrical power system of claim 10, wherein the electrical power system comprises a wind turbine power system.

13. The electrical power system of claim 12, wherein the speed condition of the electrical power system comprises a rotor speed of a rotor of the wind turbine power system.

14. The electrical power system of claim 13, further comprising filtering the rotor speed of the wind turbine power system.

15. The electrical power system of claim 13, wherein dynamically determining at least one regulator maximum limit for at least one regulator of the power converter based on the monitored speed condition further comprises:
as the rotor speed approaches a synchronous speed of the generator of the wind turbine power system, increasing the at least one regulator maximum limit to improve the SSCI performance of the wind turbine power system.

16. The electrical power system of claim 15, dynamically determining at least one regulator maximum limit for at least one regulator of the power converter based on the monitored speed condition further comprises:
as the rotor speed moves away from the synchronous speed of the generator of the wind turbine power system, decreasing the at least one regulator maximum limit of the at least one regulator.

\* \* \* \* \*